(12) United States Patent
Natalizia

(10) Patent No.: US 6,875,353 B2
(45) Date of Patent: Apr. 5, 2005

(54) SYNTHETIC MATERIAL FILTER

(75) Inventor: Mark L. Natalizia, Willits, CA (US)

(73) Assignee: Wabtec Holding Corp., Wilmerding, PA (US)

( * ) Notice: Subject to any disclaimer, the term of this patent is extended or adjusted under 35 U.S.C. 154(b) by 0 days.

(21) Appl. No.: 10/277,457

(22) Filed: Oct. 22, 2002

(65) Prior Publication Data

US 2004/0074841 A1 Apr. 22, 2004

(51) Int. Cl.[7] ............................................. B01D 21/00
(52) U.S. Cl. .................................. 210/308; 210/500.1
(58) Field of Search ....................... 210/299–311, 500.1

(56) References Cited

U.S. PATENT DOCUMENTS

| | | | | |
|---|---|---|---|---|
| 3,635,588 A | * | 1/1972 | Lester et al. ................. | 416/187 |
| 3,669,130 A | * | 6/1972 | Petroczky .................... | 132/138 |
| 3,953,926 A | * | 5/1976 | Kallikounis .................... | 30/31 |
| 4,190,543 A | | 2/1980 | Pederson et al. | |
| 4,893,814 A | * | 1/1990 | Bertozzi ...................... | 473/119 |
| 4,918,764 A | | 4/1990 | Haselswerdt et al. | |
| 4,929,349 A | | 5/1990 | Beckman | |
| 5,245,710 A | | 9/1993 | Haselswerdt et al. | |
| 5,262,051 A | | 11/1993 | Iwatsuka | |
| 5,645,732 A | | 7/1997 | Daniels | |
| 5,728,293 A | * | 3/1998 | Guoli et al. ................. | 210/151 |
| 5,779,886 A | | 7/1998 | Couture | |
| 6,015,488 A | | 1/2000 | Gavin | |
| 6,021,542 A | * | 2/2000 | Norman ........................ | 15/169 |
| 6,044,558 A | * | 4/2000 | Wu ............................. | 30/34.1 |
| 6,274,035 B1 | * | 8/2001 | Yuan et al. .................. | 210/150 |
| 6,356,833 B2 | | 3/2002 | Jeon | |
| 6,361,695 B1 | | 3/2002 | Husain et al. | |
| 6,457,476 B1 | * | 10/2002 | Elmer et al. ................. | 132/114 |
| 6,478,957 B1 | * | 11/2002 | Terry et al. .................. | 210/299 |
| 6,495,040 B1 | * | 12/2002 | Zoeller et al. ............... | 210/299 |
| 6,691,714 B1 | * | 2/2004 | Yaguchi et al. ............. | 132/201 |
| 2003/0096017 A1 | * | 5/2003 | Decker et al. .............. | 424/617 |

OTHER PUBLICATIONS

MICROPHOR, "On–Board Railroad Sewage Treatment Systems—Specification Guide", Jan. 25, 2001, pp. 1–7, (Form 809).

Microphor, Inc., "The Standard of Quality for Railroad Sanitation Systems", Jul. 1994, 4 pages, (Form R–836).

* cited by examiner

Primary Examiner—Chester T. Barry
(74) Attorney, Agent, or Firm—David C. Jenkins; Eckert Seamans Cherin & Mellott, LLC

(57) ABSTRACT

A filter for a vehicular sewage system that includes an elongated body having a plurality of longitudinal vanes and slots. The body is made from a material able to support the growth of biological agents. The slots sized to resist the passage of particles larger than about 0.04 inches. The filters are structured for use with a vehicular sewage system having a treatment tank divided into an upper chamber and a lower chamber by a membrane. The membrane has a plurality of filter openings in which the filters are disposed. The filters allow fluid waste and solid particles smaller than about 0.04 inch flow into the lower chamber. Larger particles of solid waste are exposed to air in the upper chamber thereby allowing aerobic biological agents to process the solid waste. In use, the filter allows the liquid portion of wastewater to pass from an upper chamber of the treatment tank into a lower chamber. The solid waste particles are then consumed by an aerobic bacteria in the upper chamber.

9 Claims, 3 Drawing Sheets

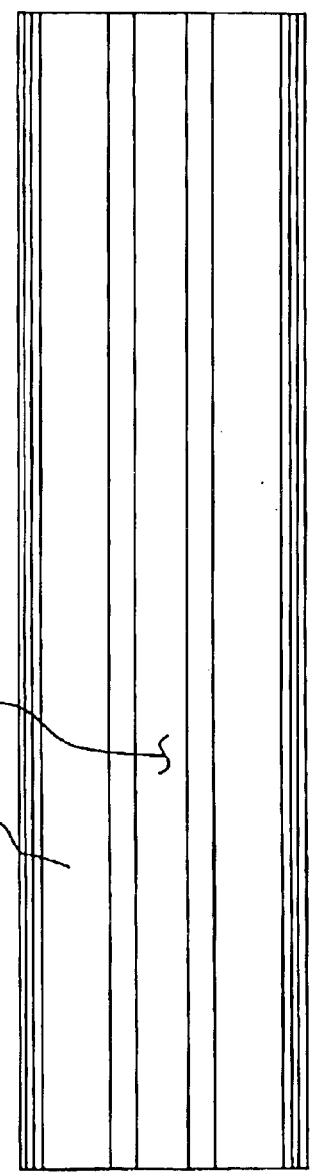
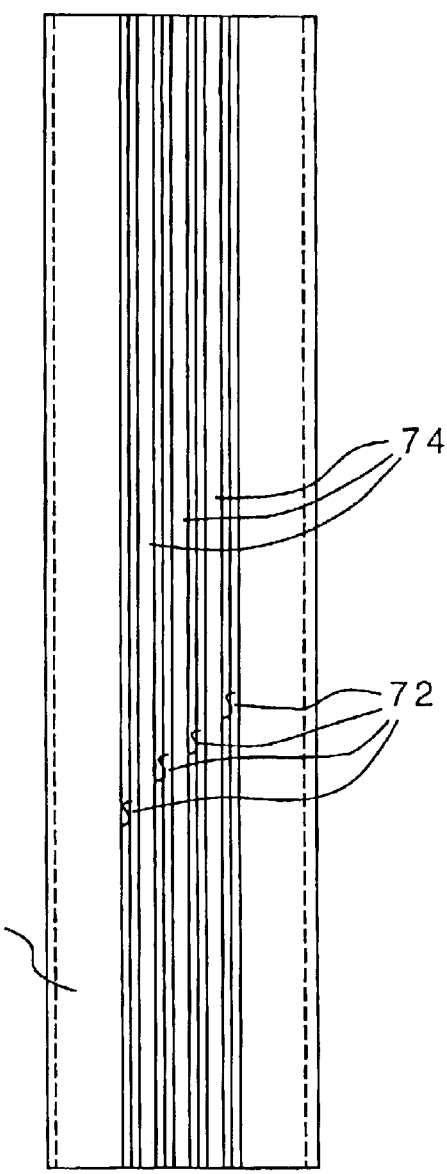
FIG. 5A    FIG. 5B
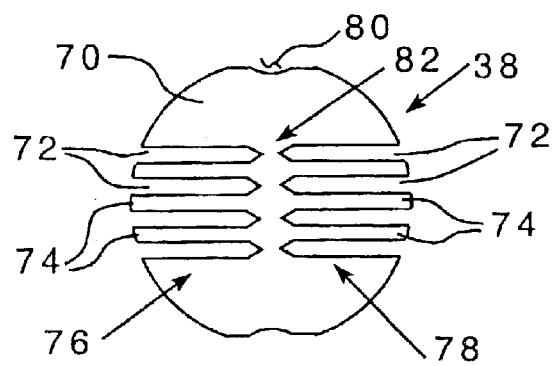
FIG. 4

SYNTHETIC MATERIAL FILTER

BACKGROUND OF THE INVENTION

1. Field of the Invention

This invention relates to a filter for a vehicular wastewater treatment system and, more specifically, to a filter made from a synthetic material that is structured to filter particles and support a biological agent, as well as the use thereof.

2. Background Information

Vehicular wastewater treatment systems, such as systems used on trains, utilize a biological agent to breakdown solid waste. The biological agent is typically a coliform bacteria, an aerobic bacteria. The wastewater treatment system includes a toilet that is coupled to, and in fluid communication with, a treatment tank. The treatment tank is further coupled to, and fluid communication with a chlorinator assembly. Generally, wastewater, including solid particles, is flushed from the toilet into the treatment tank. In the tank, the wastewater passes through a filter that is disposed above the water level of the tank. The liquid portion of the wastewater passes through the filter into the lower portion of the tank. The majority of the solid waste particles, which are too large to pass through the filter, are trapped above the filter. The biological agent feeds on the solid waste, breaking the solid waste into liquids and gases. The gas is vented from the system and the liquid flows to the lower portion of the tank. Wastewater, and any liquid created by the biological agent, flow into the chlorinator for further treatment.

The current filter used in the treatment tank employs natural redwood bark as both a filter media and as a substrate upon which the biological agents grow. The bark is disposed in, and provide passage through, a membrane adjacent to, but spaced from, the bottom of the tank. However, the availability of bark is being reduced due to depletion and harvesting moratoriums. Additionally, the bark filters are not compatible with anti-bacterial cleaning agents. That is, a cleaning agent used in the toilet passed through the filter after the toilet was flushed. The bark filter absorbed the cleaning agent and retarded the growth of the biological agent. Absorption of a strong cleaning agent ruined the filter and the filter would have to be replaced.

There is, therefore, a need for a filter structured to replace the bark filter that traps solid particle in wastewater and supports the growth of biological agents.

There is a further need for a filter that will not absorb a cleaning agent.

There is a further need for a filter that is compatible with the structure of existing treatment tanks of vehicular wastewater treatment systems.

SUMMARY OF THE INVENTION

The disclosed invention provides a synthetic filter for use in a vehicular waste treatment system. The synthetic filter is a replacement for the redwood bark filter. The synthetic filter is a generally solid cylindrical elongated body having a plurality of longitudinal comb-like slots and vanes to allow for liquid passage. There are, preferably, two sets of longitudinal comb-like slots and vanes extending towards opposite sides of the cylinder. The filter may also include two longitudinal channels. The channels are disposed on opposite sides of the filter from each other and about 90 degrees from the comb-like slots/vanes. The filter is structured to fit snugly in holes in the membrane between an upper chamber and a lower chamber in the treatment tank used in the present filter system. The filter is made from a flexible material and, as such, the comb-like slots/vanes may deform slightly as the filter is installed in the dam holes. When installed, the filter will allow a maximum particle size of about 0.04 inch to pass therethrough. The filter is made from a synthetic material. The synthetic material may be a thermoplastic rubber, such as Santoprene®, Grade 64A manufactured by Advanced Elastomer Systems, 388 S. Main St., Akron Ohio, 44311, or a thermoplastic elastomer, such as Evoprene®, Grade G963, manufactured by Alpha Gary, Albis North America, P.O. Box 711, Rosenberg, Tex. 77471-0711. Such a synthetic material will not absorb a cleaning agent and, as such, accidental use of an antibacterial cleaning agent in the toilet will not ruin the filter.

It is an object of this invention to provide a filter structured to replace the bark filter that traps solid particle in wastewater and supports the growth of biological agents.

It is a further object of this invention to provide a filter that will not absorb a cleaning agent.

It is a further object of this invention to provide a filter that is compatible with the structure of existing treatment tanks of vehicular wastewater treatment systems.

BRIEF DESCRIPTION OF THE DRAWINGS

A full understanding of the invention can be gained from the following description of the preferred embodiments when read in conjunction with the accompanying drawings in which:

FIG. 4 is an end view of the filter.

FIG. 5A is a first side view of the filter.

FIG. 5B is a second side view of the filter rotated 90 degrees from the first side view.

DESCRIPTION OF THE PREFERRED EMBODIMENTS

As used herein, "wastewater" shall include both liquid waste and solid waste, and any combination thereof.

As used herein, "support for a biological agent" shall mean physical support, such as a structure, and/or a surface that encourages the growth of biological organisms.

Figure 1:
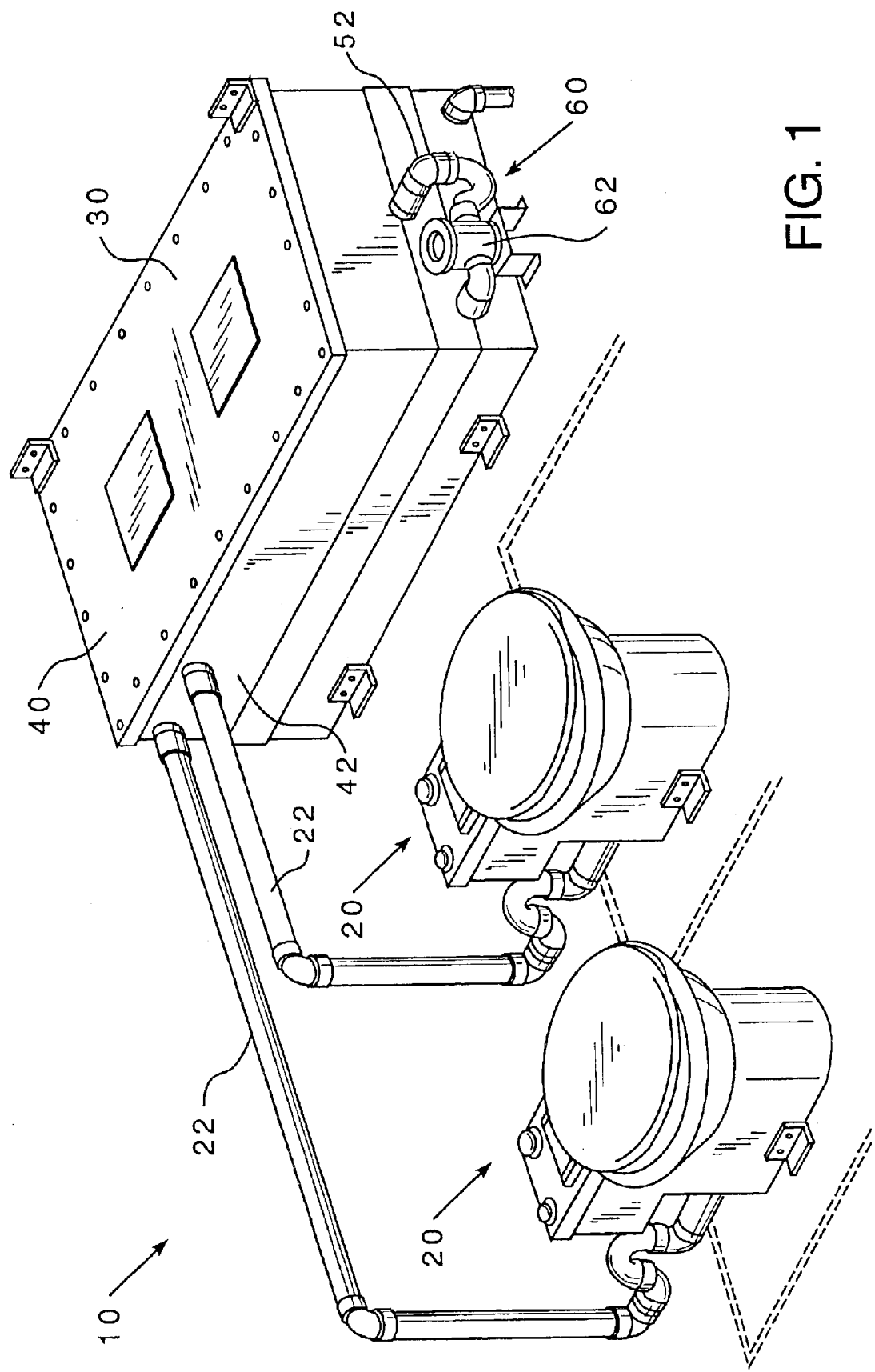
FIG. 1 is an isometric view of a vehicular waste treatment system.

As shown in FIG. 1, a vehicular waste treatment system 10 includes one or more toilet assemblies 20, a treatment tank assembly 30, and a chlorinator system 60. The toilet assemblies 20 are coupled to, and in fluid communication with, the treatment tank assembly 30 by conduits 22. The toilet assemblies 20 operate in a manner known in the art and collect wastewater which typically includes liquid waste such as water and urine as well as solid waste, such as feces and paper. When the toilet assemblies 20 are flushed, the wastewater is passed to the treatment tank assembly 30 via conduits 22.

Figure 2:
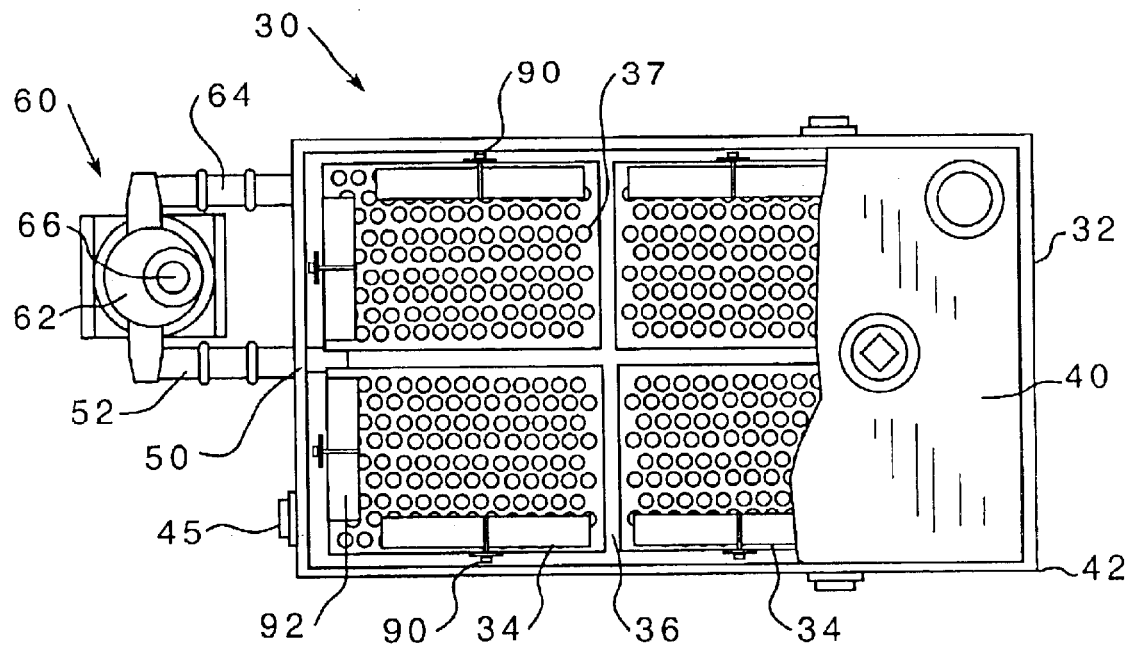
FIG. 2 is a partially cut-away side view of a treatment tank.
Figure 3:
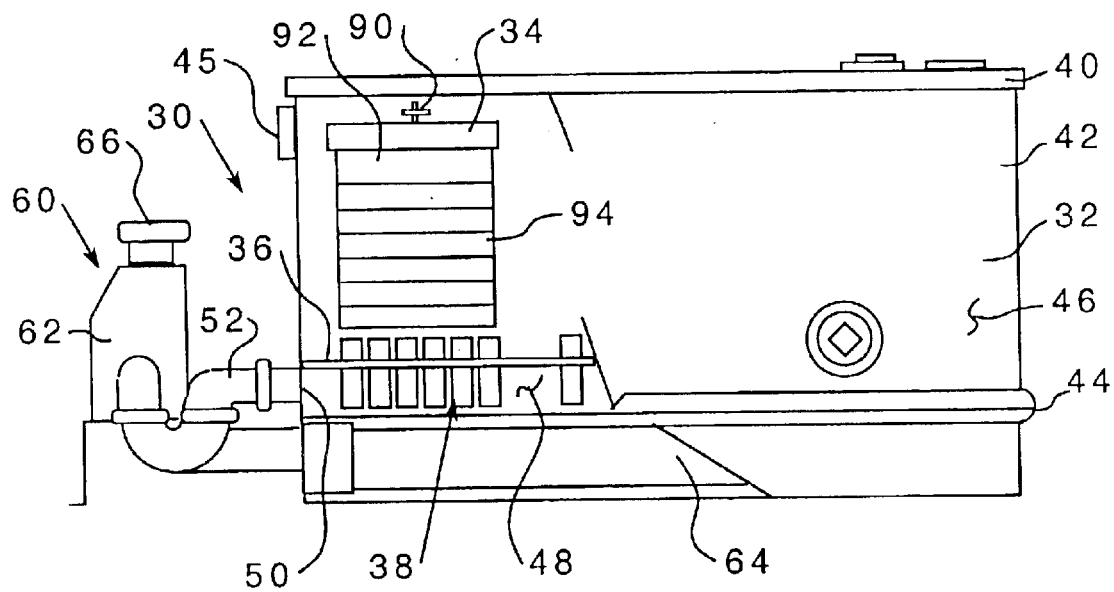
FIG. 3 is a partially cut-away top view of a treatment tank.

As shown in FIGS. 2 and 3, the treatment tank assembly 30 includes a tank assembly 32, a plurality of upper filter assemblies 34, a membrane 36, and a plurality of lower filters 38. The tank assembly 32 includes a top 40, a sidewall 42, and a bottom 44. An inlet port 45 through the top 40 or, as shown, through the sidewall 42 adjacent to the top 40. The inlet port 45 is coupled to, and in fluid communication with, the conduits 22. The membrane 36 is disposed adjacent to, but spaced from, the tank assembly bottom 44. The membrane 36 extends across the entire interior of the tank assembly 32 and, except for the filter openings 37, described below, is watertight. The membrane 36 includes a plurality of filter openings 37. The filter openings 37 preferably have a diameter of about 1.5 inches. The membrane 36 divides the tank assembly 32 into an upper chamber 46 and a lower chamber 48. The lower filters 38, detailed hereinafter, extend through the filter openings 37. Thus, for wastewater to pass from the upper chamber 46 to the lower chamber 48, the wastewater must pass through a lower filter 38. The lower chamber 48 includes an exit port 50 which extends through the sidewall 42. An egress conduit 52 is coupled to, and in fluid communication with, the exit port 50.

The egress conduit 52 is further coupled to, and in fluid communication with, the chlorinator system 60. The chlorinator system 60 includes a tablet chamber 62 and a serpentine conduit 64. The tablet chamber 62 includes a tablet opening 66 where a user may insert chlorine tablets. The egress conduit 52 is, more specifically, coupled to, and in fluid communication with, the tablet chamber 62. The tablet chamber 62 is further coupled to, and in fluid communication with, the serpentine conduit 64. The serpentine conduit 64 preferably extends in a zigzag pattern below the treatment tank assembly 30 and includes a plurality of baffles (not shown) or other means for slowing the flow of wastewater.

As shown in FIG. 4, each lower filter 38 is made from a synthetic material, preferably Santoprene. Each lower filter 38 includes an elongated body 70 which is, preferably, a generally solid cylinder. The elongated body 70 preferably has a maximum diameter between about 1.4 and 1.8 inches, and more preferably about 1.6 inches. The elongated body 70 has a plurality of longitudinal comb-like slots 72 and vanes 74 to allow for liquid passage. There are, preferably, a first set 76 and a second set 78 of longitudinal comb-like slots 72 and vanes 74. The first and second set of longitudinal combs/vanes 76, 78 extend towards opposite sides of the filter body 70. The lower filter 38 may also include two longitudinal channels 80. The channels 80 are disposed on opposite sides of the filter body 70 from each other and about 90 degrees from the first and second set of longitudinal combs/vanes 76, 78. Each filter body 70 is structured to fit snugly in the filter openings 37. Each filter body 70 is made from a flexible material and, as such, the first and second set of longitudinal combs/vanes 76, 78 may deform slightly as the filter body 70 is installed in the filter openings 37. The vanes 74 are spaced about 0.09 inch apart, that is, the slots 72 have a width of about 0.09 inch. The interior end 82 of the slots 72, that is the end nearest a centerline extending between the first and second set of longitudinal combs/vanes 76, 78, is pointed. This shape allows the first and second set of longitudinal combs/vanes 76, 78 to be collapsed more easily as the filter body 70 is inserted into the filter opening 37. Because the elongated filter body 70 has a diameter that is larger than the filter openings 37, when the filter body 70 is installed in the membrane openings 37 the first and second set of longitudinal combs/vanes 76, 78 are compressed so that the slots 72 have a width of about 0.04 inch. Thus, solid particles having a diameter greater than about 0.04 inch cannot pass through the lower filters 38. The portion of the filter body 70 that extends into the upper chamber 46 preferably extends at least about 2.5 inches above the membrane 36.

The upper filter assemblies 34 are mounted in the upper chamber 46 and attached to the interior of the tank sidewall 42. The upper filter assemblies 34 include a mounting bracket 90, a housing 92, and a plurality of upper filters 94. The upper filters 94 may have the same cross-sectional shape as the lower filters 38. The mounting bracket 90 couples the housing 92 to the tank sidewall 42. The upper filters 94 are disposed in the housing 92. The housing 92 is water permeable. The upper filters 94 provide a substrate for the aerobic biological agent when the wastewater level in the treatment tank assembly 30 is above the top of the lower filters 38. The upper filters 94 may be disposed either horizontally or vertically within the upper filter assembly housing 92.

In operation, wastewater is flushed from the toilet assemblies 20, via the conduits 22, into the treatment tank assembly 30. The wastewater moves to the bottom of the upper chamber 46 and is disposed on top of the membrane 36. The liquid portion of the wastewater passes through the slots in the lower filters 38 into the lower chamber 48. Solid waste particles in the wastewater having a diameter of greater than about 0.04 inch will be blocked by the lower filters 38 and held in the upper chamber 46. An aerobic biological agent, such as a coliform bacteria, is present in the treatment tank assembly 30, or is introduced along with the wastewater. The biological agent breaks the solid waste particles down into various liquids and gases. The gases are vented from the treatment tank assembly 30 and the liquids pass through the lower filters 38 into the lower chamber 48. Wastewater and other liquids in the lower chamber 48 are passed on to the chlorinator system 60. The chlorinator system 60 allows the user to add chlorine tablets which will kill all biological agents as the wastewater passes through the serpentine conduit 64. After the wastewater passes through the chlorinator system 60, the wastewater may be dumped or further treated if required.

Typically, the liquid level in the upper chamber 46 will not rise above the top of the lower filters 38. As such, the aerobic biological agent on the lower filter 38 will usually be exposed to air. However, during times of high use, the treatment tank assembly 30 may fill so quickly that the liquid level in the upper chamber 46 rises above the top of the lower filters 38. When this happens, the surface of the liquid in the upper chamber will be in contact with the upper filter assemblies 34. The aerobic biological agent is also disposed on the substrate of the upper filters 94 and will begin to process the solid waste particles floating at the top of the wastewater.

It will be appreciated that the present invention provides a filter structured to replace the bark filter that traps solid particle in wastewater. This filter is made from a material that supports the growth of biological agents capable of consuming solid waste particles. The filter also will not absorb a cleaning agent and, as such, may be used for an extended period of time, unlike the prior bark filters which could be ruined if exposed to a cleaning agent. While the filter is preferably used in a vehicular wastewater treatment tank, the filter may be used with stationary treatment tanks or other types of treatment tanks.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A filter for a vehicular sewage system, said vehicular sewage system having a treatment tank divided into an upper chamber and a lower chamber by a membrane, said membrane having a plurality of filter openings, said filter comprising:

an elongated body having a plurality of longitudinal vanes and slots;

said body made from a material able to support the growth of biological agents; and said slots sized to resist the passage of particles larger than about 0.04 inches and;

said filter is made from a material selected from the group consisting of thermoplastic rubber and thermoplastic elastomers.

2. The filter of claim 1 wherein, said vanes and slots are disposed in a comb-like configuration.

3. The filter of claim 2 wherein, there are two sets of said comb-like vanes and slots, said sets extending in generally opposite directions.

4. The filter of claim 3 wherein, said elongated body is generally cylindrical.

5. The filter of claim 4 wherein, said body has a maximum diameter between about 1.4 and 1.8 inches.

6. The filter of claim 4 wherein, said body has a maximum diameter of about 1.6 inches.

7. The filter of claim 4 wherein, said set of vanes and slots includes three vanes and four slots.

8. The filter of claim 7 wherein:

said body has a diameter that is larger than said filter openings;

said slots are between about 0.03 and 0.10 inch wide; and said slots structured to be compressed when said body is inserted into said filter opening.

9. The filter of claim 7 wherein:

said body has a diameter that is larger than said filter openings;

said slots are about 0.09 inch wide; and said slots structured to be compressed when said body is inserted into said filter opening.

* * * * *

UNITED STATES PATENT AND TRADEMARK OFFICE
CERTIFICATE OF CORRECTION

PATENT NO. : 6,875,353 B2  
DATED : April 5, 2005  
INVENTOR(S) : Mark L. Natalizia It is certified that error appears in the above-identified patent and that said Letters Patent is hereby corrected as shown below:

Column 5,
Line 7, remove "and".

Signed and Sealed this

Twenty-first Day of June, 2005

JON W. DUDAS
*Director of the United States Patent and Trademark Office*